(12) United States Patent
Liu et al.

(10) Patent No.: US 11,814,856 B2
(45) Date of Patent: Nov. 14, 2023

(54) TOWER TUBE SECTION, TOWER FRAME AND WIND POWER GENERATOR SET

(71) Applicant: BEIJING GOLDWIND SCIENCE & CREATION WINDPOWER EQUIPMENT CO., LTD., Beijing (CN)

(72) Inventors: Jinlei Liu, Beijing (CN); Ke Zhang, Beijing (CN); Junjie Han, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 185 days.

(21) Appl. No.: 17/441,195

(22) PCT Filed: Jan. 3, 2020

(86) PCT No.: PCT/CN2020/070248
§ 371 (c)(1),
(2) Date: Sep. 20, 2021

(87) PCT Pub. No.: WO2020/186896
PCT Pub. Date: Sep. 24, 2020

(65) Prior Publication Data
US 2022/0162874 A1 May 26, 2022

(30) Foreign Application Priority Data
Mar. 20, 2019 (CN) .......................... 201910212957.5

(51) Int. Cl.
*E04H 12/20* (2006.01)
*F03D 13/20* (2016.01)
(Continued)

(52) U.S. Cl.
CPC .............. *E04H 12/20* (2013.01); *E04H 12/08* (2013.01); *E04H 12/342* (2013.01); *F03D 13/20* (2016.05)

(58) Field of Classification Search
CPC ....... E04H 12/20; E04H 12/08; E04H 12/342; F03D 13/20; F05B 2240/912; Y02E 10/72; Y02E 10/728
See application file for complete search history.

(56) References Cited

U.S. PATENT DOCUMENTS 11,136,967 B2 * 10/2021 Garcia .................... F03D 80/80
2007/0256388 A1 * 11/2007 Ianello ................ E04H 12/2292
52/651.07
(Continued)

FOREIGN PATENT DOCUMENTS

CN 103527424 A 1/2014
CN 103669967 A 3/2014
(Continued)

OTHER PUBLICATIONS

Australian Examination Report No. 1; dated Nov. 23, 2022; Appln. No. 2020243633.
(Continued)

*Primary Examiner* — Andrew J Triggs

(57) ABSTRACT

The present application relates to a tower tube section, a tower frame and a wind power generator set. The tower tube section includes a tower tube section body; a reinforcing assembly including a supporting member connected to the tower tube section body and a plurality of reinforcing cables connected to the supporting member. The plurality of reinforcing cables are arranged at intervals along a circumferential direction of the tower tube section body, and each of the plurality of reinforcing cables extends along an axial direction of the tower tube section body and is apart from a periphery surface of the tower tube section body by a (Continued)

predetermined distance in a radial direction of the tower tube section body. The tower tube section has a strong bearing capacity and low cost, which can meet the power generation benefits of the wind power generator set.

18 Claims, 19 Drawing Sheets

(51) Int. Cl.
*E04H 12/08* (2006.01)
*E04H 12/34* (2006.01)

(56) References Cited

U.S. PATENT DOCUMENTS

| | | |
|---|---|---|
| 2011/0138704 A1 | 6/2011 | Bagepalli et al. |
| 2016/0215761 A1 | 7/2016 | Rohden |
| 2018/0003158 A1* | 1/2018 | Pedersen ............... E04H 12/342 |
| 2022/0162874 A1* | 5/2022 | Liu ........................ F03D 13/20 |

FOREIGN PATENT DOCUMENTS

| | | | |
|---|---|---|---|
| CN | 205578191 U | 9/2016 | |
| CN | 205805834 U | 12/2016 | |
| CN | 205955922 U | 2/2017 | |
| CN | 107288823 A | 10/2017 | |
| CN | 107806397 A * | 3/2018 | ............. F03D 13/20 |
| CN | 107806397 A | 3/2018 | |
| WO | 2014033332 A1 | 3/2014 | |

OTHER PUBLICATIONS

Second Chinese Office Action dated May 19, 2022; Appln. No. 201910212957.5 (English translation relating to claims 1-16 only).
Extended European Search Report dated Mar. 18, 2022; Appln. No. 20773976.4.
First Indian Office Action dated Mar. 9, 2022; Appln. No. 202117042529.
The First Chinese Office Action dated Dec. 24, 2021; Appln. No. 201910212957.5 (provided with english translation of Concise Explanation of Relevance for CNOA1).
The International Search Report dated Mar. 26, 2020; Appln. No. PCT/CN2020/070248.

* cited by examiner

TOWER TUBE SECTION, TOWER FRAME AND WIND POWER GENERATOR SET

CROSS-REFERENCE OF RELATED APPLICATIONS

The present application is a National Stage of International Application No. PCT/CN2020/070248, filed on Jan. 3, 2020, which claims priority to Chinese Patent Application No. 201910212957.5 filed on Mar. 20, 2019, both of which are hereby incorporated by reference in their entireties.

TECHNICAL FIELD

The present application relates to the field of wind power technology, in particular to a tower tube section, a tower frame and a wind power generator set.

BACKGROUND

A wind power generator set is a device that converts wind energy into electrical energy. The tower tube is a main component for supporting the entire wind power generator and is the foundation of the wind power generator set. With the development of the field of wind power technology, wind power generator sets are gradually developing to a larger megawatt level, and the load-bearing capacity of the corresponding tower tubes needs to be improved.

In the prior art, in order to increase the bearing capacity of the tower tube, the wall thickness of each tower tube section of the tower tube or the radial size of the tower tube section is usually increased to increase the strength of the corresponding tower tube section, thereby increasing the bearing capacity of the entire tower tube. Although the above manner can improve the bearing requirements of the corresponding tower tube section, it also brings corresponding shortcomings. The shortcomings mainly manifest that the material used for the tower tube section is increased, the cost is increased, and it is not beneficial to the power generation benefits of the wind power generator set.

Therefore, there is an urgent need for a new tower tube section, tower frame and wind power generator set.

SUMMARY

Embodiments of the present application provide a tower tube section, a tower frame, and a wind power generator set. The tower tube section has a strong bearing capacity and is low in cost, which can meet the power generation benefits of the wind power generator set.

In one aspect, embodiments of the present application provide a tower tube section, which includes a tower tube section body; a reinforcing assembly including a supporting member connected to the tower tube section body and a plurality of reinforcing cables connected to the supporting member, the plurality of reinforcing cables are arranged at intervals in a circumferential direction of the tower tube section body, and each of the plurality of reinforcing cables extends along an axial direction of the tower tube section body and is apart from a periphery surface of the tower tube section body by a predetermined distance in a radial direction of the tower tube section body.

In another aspect, embodiments of the present application provide a tower frame connected to a wind generator base, wherein the tower frame includes two or more tower tube sections, and the two or more tower tube sections are stacked with each other and the tower tube section located on the outermost side in the stacking direction can be connected to the wind generator base, wherein at least one tower tube section is the above-mentioned tower tube section.

In further another aspect, embodiments of the present application provide a wind power generator set, which includes the tower frame as described above.

According to the tower tube section, the tower frame and the wind power generator set provided by embodiments of the present application, the tower tube section includes a tower tube section body and a reinforcing assembly, and the reinforcing assembly includes a supporting member connected to the tower tube section body and a plurality of reinforcing cables connected to the supporting member. Since the plurality of reinforcing cables are spaced apart from each other along the circumferential direction of the tower tube section body and each reinforcing cable extends along the axial direction of the tower tube section body, when the tower tube section is applied to the tower tube and bears the load, the load acting on the tower tube section body can be transmitted to the plurality of reinforcing cables through the supporting member, and the plurality of reinforcing cables share the load borne by the tower tube section body, thereby improving the bearing capacity of the entire tower tube section. The reinforcing assembly is apart from the tower tube section body by a predetermined distance, so that the tower tube section body and the reinforcing assembly can be processed separately without damaging the original structure of the tower tube section body. Under the premise of improving the bearing capacity of the tower tube section, the processing difficulty and processing cost can be reduced.

BRIEF DESCRIPTION OF THE DRAWINGS

The features, advantages, and technical effects of exemplary embodiments of the present application will be described below with reference to the accompanying drawings.

DETAILED DESCRIPTION

The features and exemplary embodiments of various aspects of the present application will be described in detail below. The orientation words appearing in the following description are all directions shown in the figures, and do not limit the specific structures of the tower tube section, the tower frame and the wind power generator set in the present application. In the description of the present application, it should also be noted that, unless otherwise clearly specified and limited, the terms "mounting" and "connecting" should be understood in a broad sense, for example, it can be a fixed connection or a detachable connection, or an integral connection; it can be a direct connection or an indirect connection. For the skilled person in the art, the specific meaning of the above-mentioned terms in the present application can be understood according to specific circumstances.

In order to better understand the present application, the tower tube section, the tower frame and the wind power generator set according to the embodiments of the present application will be described in detail below with reference to FIGS. 1 to 26.

Figure 1:
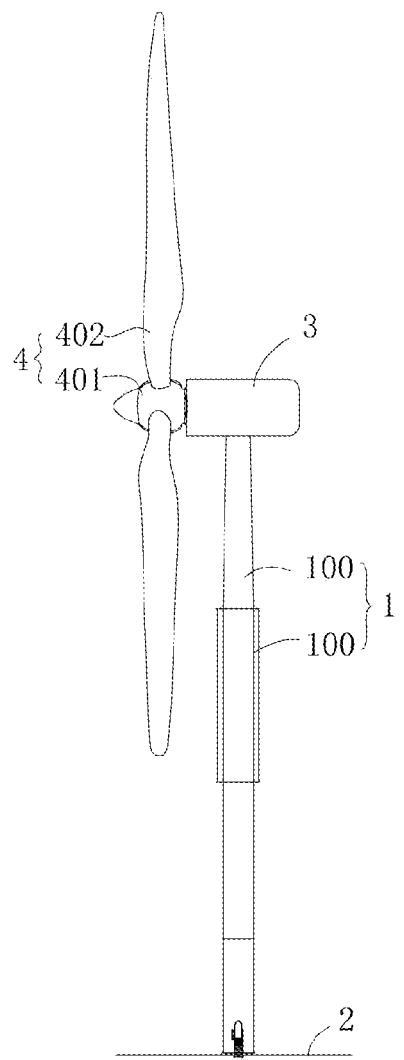
FIG. 1 is a schematic diagram of the structure of a wind power generator set according to an embodiment of the present application.
Figure 2:
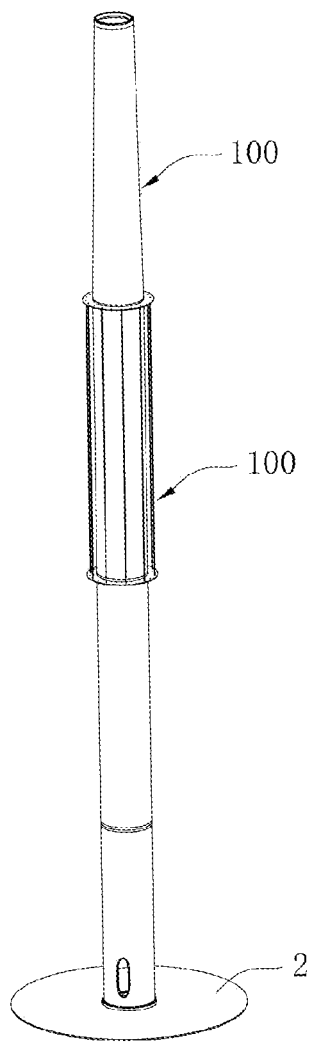
FIG. 2 is a schematic diagram of the structure of a tower frame according to an embodiment of the present application.

Referring to FIGS. 1 and 2, FIG. 1 shows a schematic diagram of the structure of a wind power generator set according to an embodiment of the present application, and FIG. 2 shows a schematic diagram of the structure of a tower frame according to an embodiment of the present application.

Embodiments of the present application provide a wind power generator set, which mainly includes a wind generator base 2, a tower frame 1, a nacelle 3, a generator (not shown), and an impeller 4. The tower frame 1 is connected to the wind generator base 2, and the nacelle 3 is arranged on top of the tower frame 1. The generator is disposed in nacelle 3. The impeller 4 includes a hub 401 and a plurality of blades 402 connected to the hub 401, and the impeller 4 is connected to the rotating shaft of the generator through the hub 401. When the wind acts on the blades 402, it drives the entire impeller 4 and the rotating shaft of the generator to rotate, thereby meeting the power generation requirements of the wind power generator set.

From the above description of the structure of the wind power generator set, it can be seen that heavy equipment such as the nacelle 3, the generator and the impeller 4 are all supported above the tower frame 1. When the height of the wind power generator set is high or the megawatt level is large, the bearing capacity of the tower frame 1 has higher requirements. In order to better meet the above requirements, embodiments of the present application also provide a tower frame 1 that can be used in the above-mentioned wind power generator set. The tower frame 1 includes two or more tower tube sections 100. Two or more tower tube sections 100 are stacked with each other and the tower tube section 100 located on the very bottom side in the stacking direction can be connected to the wind generator base 2. In specific implementation, the tower frame 1 can be a steel tower, and each of the tower tube sections 100 thereof is made of steel.

Figure 3:
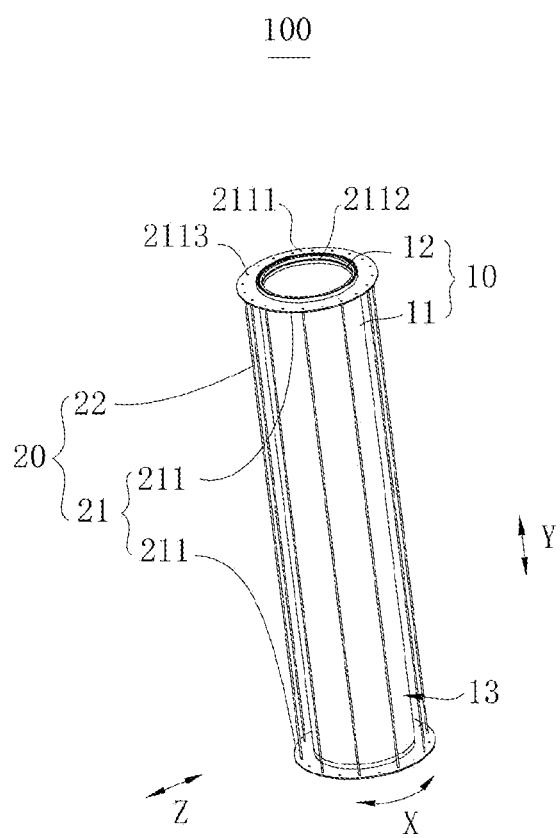
FIG. 3 is a schematic diagram of the structure of a tower tube section according to an embodiment of the present application.
Figure 4:
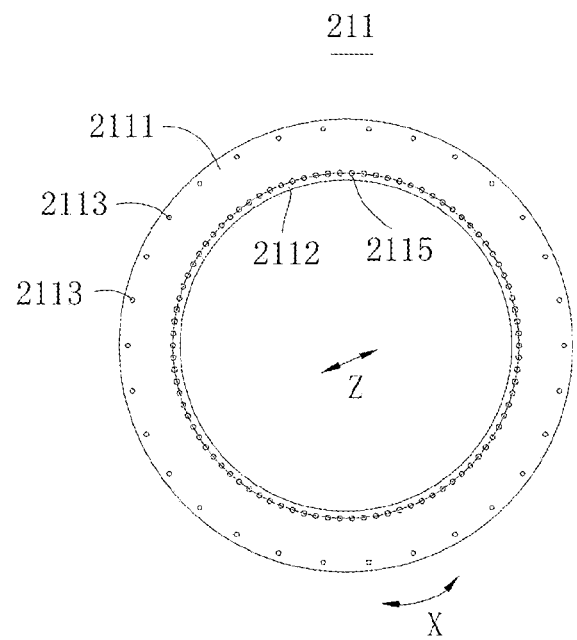
FIG. 4 is a schematic diagram of the structure of the supporting plate according to a first embodiment of the present application.

Referring to FIG. 3 together, FIG. 3 shows a schematic diagram of the structure of a tower tube section according to an embodiment of the present application, and FIG. 4 shows a schematic diagram of the structure of a supporting plate according to a first embodiment of the present application. In order to better improve the bearing capacity of the entire tower frame 1, the embodiment of the present application further provides a new tower tube section 100, which has a better bearing capacity. As shown in FIG. 3, the tower tube section 100 provided by the embodiment of the present application includes a tower tube section body 10 and a reinforcing assembly 20, and the tower tube section body 10 is a cylindrical structure. The reinforcing assembly 20 includes a supporting member 21 connected to the tower tube section body 10 and a plurality of reinforcing cables 22 connected to the supporting member 21. The plurality of reinforcing cables 22 are spaced apart from each other along the circumferential direction X of the tower tube section body 10. Each reinforcing cable 22 extends along the axial direction Y of the tower tube section body 10 and is spaced apart from a periphery surface 13 of the tower tube section body 10 by a predetermined distance in the radial direction Z of the tower tube section body 10.

The tower tube section 100 provided by embodiments of the present application has strong bearing capacity and low cost, and can meet the power generation benefits of the wind power generator set.

Referring to FIGS. 3 and 4 continuously, in some alternative examples, the tower tube section body 10 has a cylindrical structure as a whole, and may include one section of cylinder 11 with flanges 12 connected to both ends of the cylinder 11. The predetermined distance mentioned above is the minimum distance from a periphery surface of each reinforcing cable 22 to a periphery surface of the cylinder 11 in the radial direction Z of the tower tube section body 10. Optionally, the predetermined distance is greater than zero.

In order to facilitate the connection between the supporting plate 211 and the tower tube section body 10, the supporting plate 211 is at least partially stacked with the tower tube section body 10 in the axial direction Y of the tower tube section body 10. For the ease of description, the portion where the supporting plate 211 and the tower tube section body 10 are stacked on each other is called as the laminated portion 2112. The laminated portion 2112 is provided with a through hole 2115 penetrating in the axial direction Y to connect and fix the laminated portion 2112 of the supporting plate 211 with the flange 12 at the end of the cylinder 11 by fasteners such as bolts.

In some optional embodiments, in order to facilitate the connection between the reinforcing cable 22 and each supporting plate 211 of the supporting member 21, the protruding portion 2111 of each supporting plate 211 is provided with a plurality of connecting positions 2113. Each reinforcing cable 22 is connected to the protruding portion 2111 of the corresponding supporting plate 211 through corresponding connecting position 2113.

In specific implementation, the protruding portion 2111 and the laminated portion 2112 may be an integral structure, and both of them are closed loops extending around the circumferential direction X of the tower tube section body 10.

Figure 5:
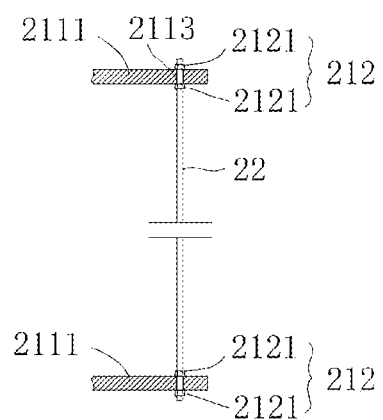
FIG. 5 is a schematic diagram of the connection between the reinforcing cable and the connecting position according to an embodiment of the present application.

Referring to FIG. 5, FIG. 5 shows a schematic diagram of the connection between the reinforcing cable 22 and the connecting position 2113 according to an embodiment of the present application. The connecting position 2113 provided by the embodiment of the present application can adopt a variety of structural forms. As an optional embodiment, the connecting position 2113 may be a through hole that penetrates the supporting plate 211 along the axial direction Y of the tower tube section body 10, and a locking member 212 is provided at each through hole to fix the reinforcing cable 22 at the corresponding connecting position 2113. The connecting position 2113 adopts a structure form of through hole, which is easy to process and only needs to dispose an opening of corresponding size at the preset position of the protruding portion 2111.

The structural form of the locking member 212 can be selected according to the connection strength, cost requirements, etc., as long as the reinforcing cable 22 can be fixed at the corresponding connecting position 2113. In some optional examples, each reinforcing cable 22 may be a rigid rod. Each locking member 212 may include more than two lock nuts 2121, and at least two lock nuts 2121 are arranged opposed to each other on both sides of the protruding portion 2111 in the axial direction Y of the tower tube section body 10 and is threadedly connected with the reinforcing cable 22. When the reinforcing cable 22 is locked and fixed, the locking nuts 2121 on both sides of the same protruding portion 2111 abut against the protruding portion 2111.

Figure 6:
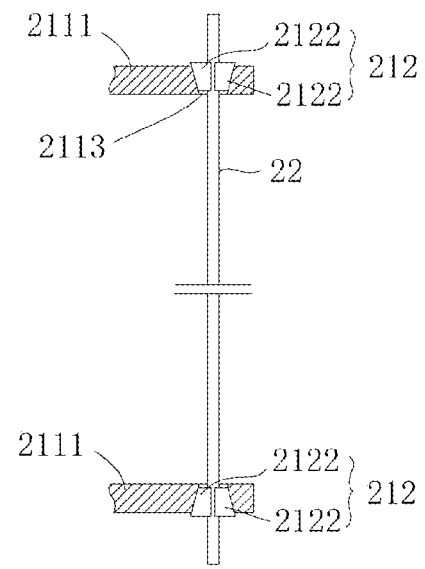
FIG. 6 is a schematic diagram of the connection between the reinforcing cable and the connecting position according to another embodiment of the present application.
Figure 7:
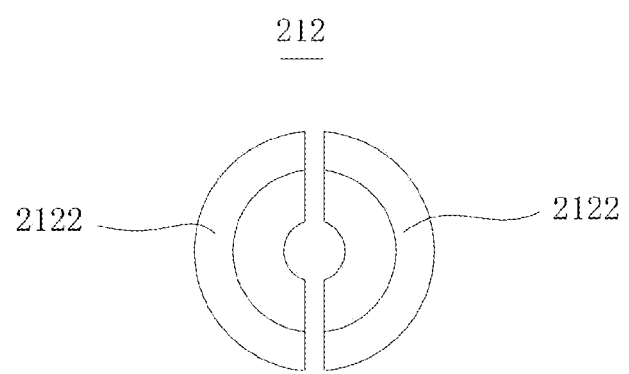
FIG. 7 is a schematic diagram of the structure of a locking member according to an embodiment of the present application.

Referring to FIGS. 6 and 7 together, FIG. 6 shows a schematic diagram of the connection between the reinforcing cable 22 and the connecting position 2113 according to another embodiment of the present application, and FIG. 7 shows a schematic diagram of the structure of the locking member 212 according to an embodiment of the present application. It can be understood that fixing the reinforcing cable 22 at the corresponding connecting position 2113 through the lock nut 2121 is only an optional implementation, but is not limited to this manner. As shown in FIGS. 6 and 7, in some other examples, the locking member 212 may also include more than two arc-shaped locking plugs 2122. Two or more arc-shaped locking plugs 2122 are spliced with each other to form a conical ring body and extends at least partially into the through hole to clamp and fix the reinforcing cable 22. Each arc-shaped locking plug 2122 can be made of high-strength materials such as steel and alloy. Multiple arc-shaped locking plugs 2122 are used to provide a large squeezing force for the reinforcing cable to fix the reinforcing cable, thereby fixing the reinforcing cable 22 at the corresponding connecting position 2113 better. The number of arc-shaped locking plugs 2122 included by the locking member 212 can be disposed according to requirements, for example, it can be two, three, or even more. Specifically, it can selected according to the overall size of the locking member 212, as long as it can meet the fixing requirements between the reinforcing cable 22 and the corresponding connecting position 2113.

Figure 8:
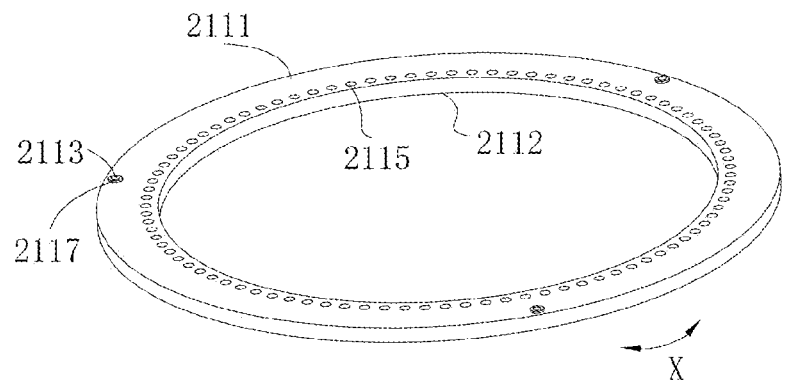
FIG. 8 is a schematic diagram of the structure of the supporting plate according to a second embodiment of the present application.

Referring to FIG. 8 together, FIG. 8 shows a schematic diagram of the structure of the supporting plate 211 according to a second embodiment of the present application. When the connecting position 2113 adopts a structure form of connection hole, as an optional implementation, a protective sleeve 2117 is detachably connected to the inside of at least one connecting position 2113. The protective sleeve 2117 extends in the axial direction. The shape of the protective sleeve 2117 matches the shape of the connecting position 2113. The protective sleeve 2117 and the connecting position 2113 can be connected to each other in an interference fit. Of course, the two can also be connected to each other in a threaded connection, and the protective sleeve 2117 can be a copper sleeve. By providing the protective sleeve 2117, the side wall of the connecting position 2113 formed by enclosing the connecting body can be protected, avoiding the connecting body from being worn out, improving the bearing capacity of the connecting body, and avoiding that the connecting body is pulled and broken in the radial direction of the annular body and thus the safety of wind power generator sets is affected. After the protective sleeve 2117 is worn out, the supporting plate can be reused by replacing a new protective sleeve 2117 without replacing the entire supporting plate, which improves the service life of the supporting plate and saves the maintenance cost of the tower frame.

In specific implementation, a protective sleeve 2117 may be provided inside each connecting position 2113. In order to restrict the protective sleeve 2117 from being detached from the corresponding connecting position 2113, further, a flange may be provided on a periphery of the protective sleeve 2117 so that the flange abuts against the surface of the supporting plate away from the wind generator base.

Figure 9:
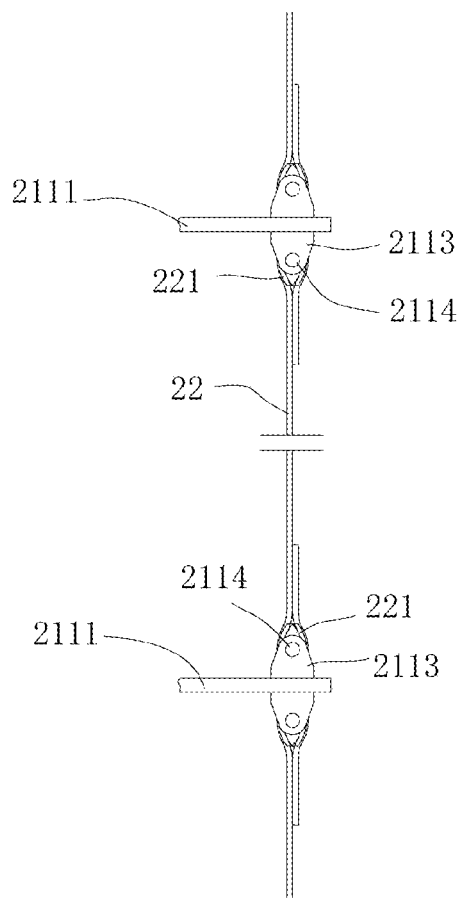
FIG. 9 is a schematic diagram of the connection between the reinforcing cable and the connecting position according to further another embodiment of the present application.

Referring to FIG. 9 together, FIG. 9 shows a schematic diagram of the connection between the reinforcing cable 22 and the connecting position 2113 according to further another embodiment of the present application. In the above embodiments, it is only an optional way to define the connecting position 2113 as a through hole, but it is not limited to this way. In some other examples, each reinforcing cable 22 may be a flexible rod, such as a steel wire. In addition, the connecting position 2113 may also be an ear seat with a rotating shaft 2114, and the reinforcing cable 22 is rotatably connected with the rotating shaft 2114. Specifically, the end of the reinforcing cable 22 can be bent, and the bent portions are fixed to the other unbent portions of the reinforcing cable 22 respectively to form a collar 221 on the reinforcing cable 22. The collar 221 is sleeved on the rotating shaft 2114 of the corresponding ear sear and the reinforcing cable 22 is tensioned as a whole, which can also realize the connection between the reinforcing cable 22 and the connecting position 2113 so as to ensure the bearing requirement of the tower tube section 100.

Figure 10:
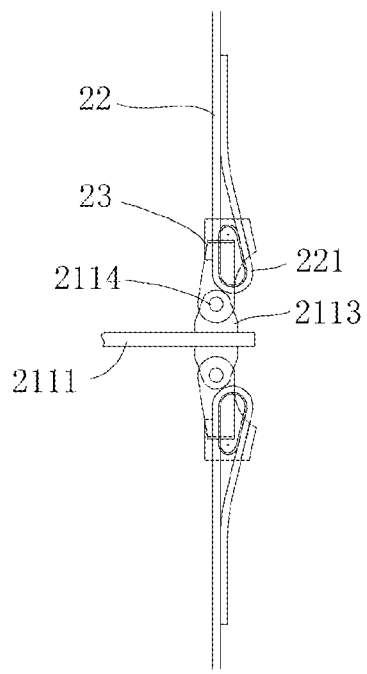
FIG. 10 is a schematic diagram of the connection between the reinforcing cable and the connecting position according to still another embodiment of the present application.

Referring to FIG. 10, FIG. 10 shows a schematic diagram of the connection between the reinforcing cable 22 and the connecting position 2113 according to still another embodiment of the present application. The collar 221 on the reinforcing cable 22 can be directly connected with the rotating shaft 2114 on the ear seat. Of course, in order to ensure the strength of the connection between the reinforcing cable 22 and the corresponding rotating shaft 2114 and to facilitate the connection between the two, optionally, the reinforcing cables 22 are respectively fixed by the wedge block 23 to the unbent portion of the rod body of the reinforcing cables 22 after bending. Then, the wedge block 23 is rotatably connected with the rotating shaft 2114 on the corresponding ear seat, which can also meet the connection between the reinforcing cable 22 and the connecting position 2113 and realize the enhancement of the bearing capacity of the tower tube section 100.

Figure 11:
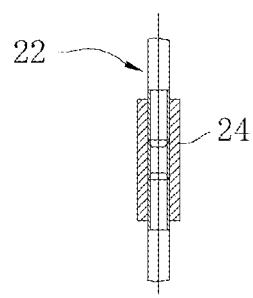
FIG. 11 is a schematic diagram of a partial structure of a reinforcing cable according to an embodiment of the present application.

Referring to FIG. 11 together, FIG. 11 shows a schematic diagram of partial structure of a reinforcing cable 22 according to an embodiment of the present application. When the length of the reinforcing cable 22 is required to be longer, the whole reinforcing cable 22 can be formed by connecting multiple rods. Two adjacent rods can be connected to each other through a connecting sleeve 24, and each rod of the reinforcing cable 22 can be threadedly connected with the connecting sleeve 24.

Figure 12:
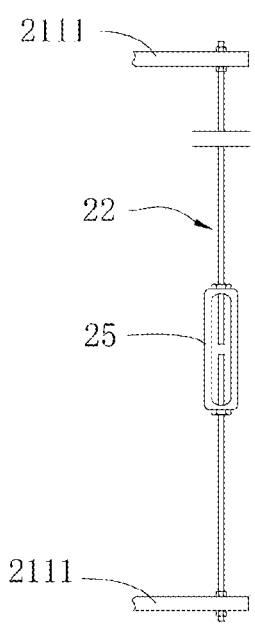
FIG. 12 is a schematic diagram of the connection between a reinforcing cable and a rigging screw buckle according to an embodiment of the present application.
Figure 13:
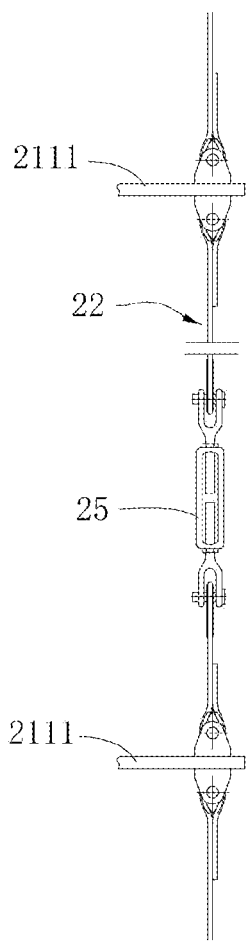
FIG. 13 is a schematic diagram of the connection between a reinforcing cable and a rigging screw buckle according to another embodiment of the present application.

Referring to FIGS. 12 and 13 together, FIGS. 12 and 13 show the schematic diagrams of the connection between the reinforcing cable 22 and the rigging screw buckle 25 according to two different embodiments of the present application. Regardless of whether the reinforcing cable 22 adopts a flexible cable or a rigid pull rod, in order to facilitate the tensioning of the reinforcing cable 22, further, a rigging screw buckle 25 can be provided on the reinforcing cable 22, and the rigging screw buckle 25 can be adjusted to realize the tightening degree of the reinforcing cable and further ensure the bearing capacity of the tower tube section 100 of this form.

Figure 14:
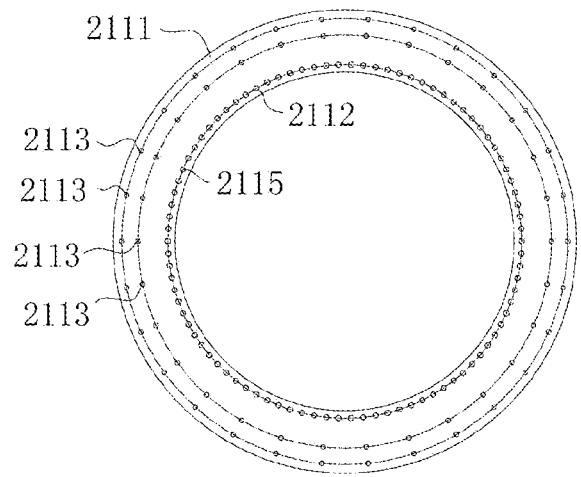
FIG. 14 is a schematic diagram of the structure of the supporting plate according to a third embodiment of the present application.
Figure 15:
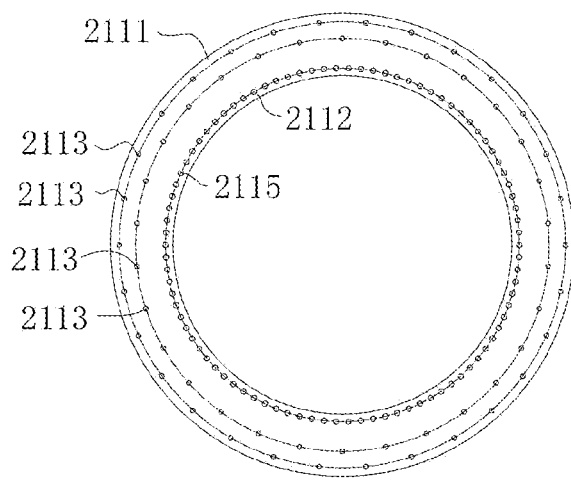
FIG. 15 is a schematic diagram of the structure of the supporting plate according to a fourth embodiment of the present application.

Referring to FIGS. 14 and 15 together, FIG. 14 shows a schematic diagram of the structure of a supporting plate 211 according to a third embodiment of the present application, and FIG. 15 shows a schematic diagram of the structure of the supporting plate 211 according to a fourth embodiment of the present application. The number of connecting positions 2113 on the supporting plate 211 provided by the foregoing embodiments of the present application can be determined according to the number of reinforcing cables 22. The number of connecting positions 2113 on each supporting plate 211 can be selected to be greater than or equal to the number of reinforcing cables 22. A plurality of connecting positions 2113 are divided into two or more groups of connecting positions arranged at intervals along the radial direction Z. The connecting positions 2113 included in each group of connecting positions are arranged at intervals along the circumferential direction X of the supporting plate 211, and may be evenly distributed. Furthermore, the connecting positions 2113 of the same group are located on the same index circle, so that the bearing capacity of the tower tube section 100 is more uniform. As shown in FIG. 14, the connecting positions 2113 of different groups can be arranged in a one-to-one correspondence in the radial direction Z of the tower tube section body 10. Of course, they can be arranged to be interleaved with each other as shown in FIG. 15.

The plurality of reinforcing cables 22 correspond to part or all of at least one group of connecting positions 2113 in a one-to-one correspondence and are connected thereto. By arranging the plurality of connecting positions 2113 in the above-mentioned manner, the distance between the reinforcing cable 22 and the tower tube section body 10 can be adjusted according to requirements, so as to adjust the bearing capacity of the tower tube section 100. Moreover, when a tower tube section 100 with a higher bearing capacity is required, the connecting positions 2113 in each group of connecting positions 2113 can be provided with reinforcing cables 22 in a one-to-one correspondence. The bearing capacity of the tower tube section 100 can be improved by increasing the number of reinforcing cables 22.

In the specific implementation of the tower tube section 100 of the above embodiments, the extending direction of the reinforcing cable 22 and the axial direction Y of the tower tube section body 10 may be parallel to each other. Through the above arrangement, the bearing capacity of each reinforcing cable 22 can be maximized.

Figure 16:
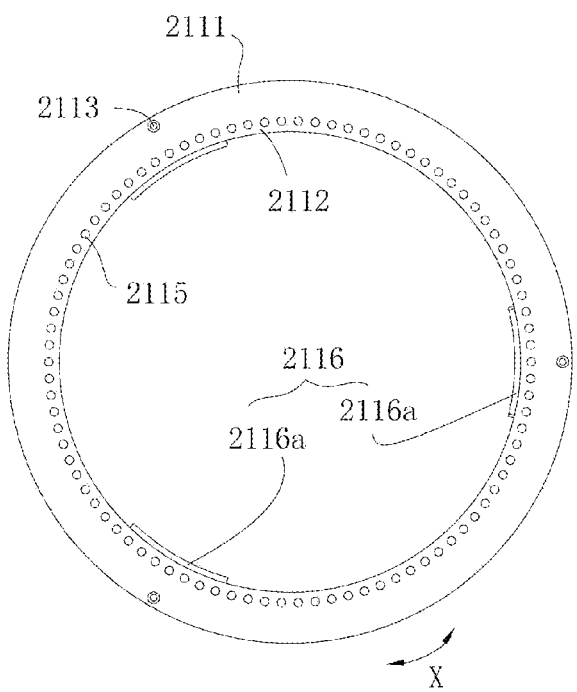
FIG. 16 is a schematic diagram of the structure of the supporting plate according to a fifth embodiment of the present application.
Figure 17:
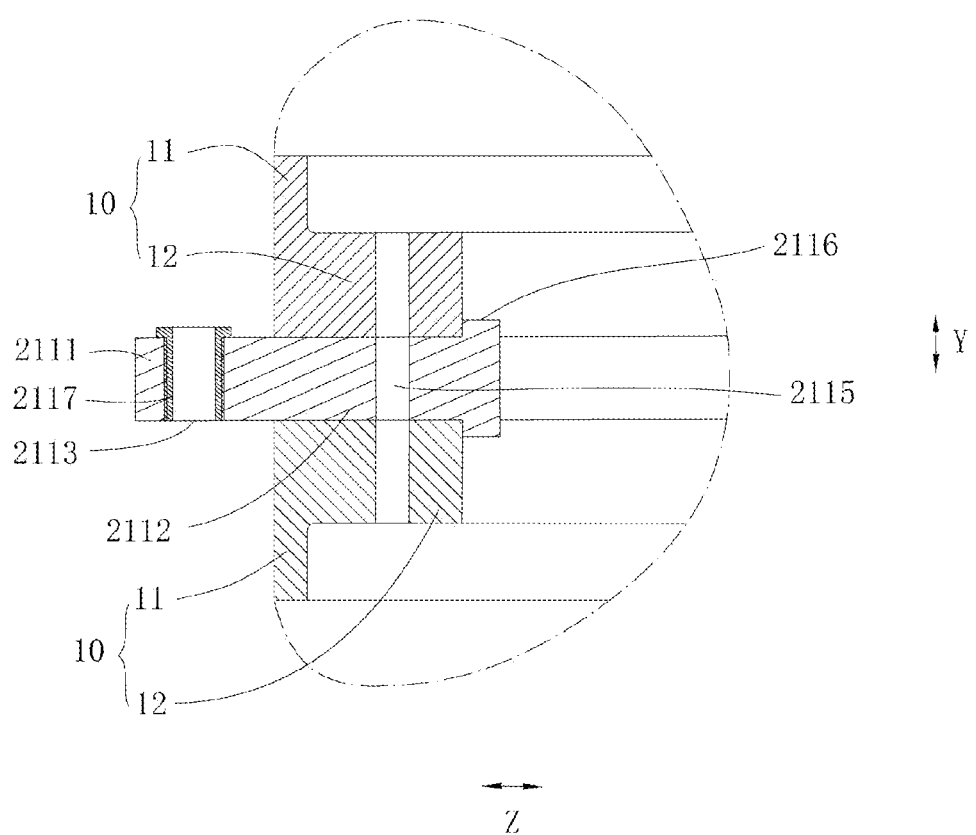
FIG. 17 is a partial sectional view of the connection between the supporting plate and the tower tube section body according to an embodiment of the present application.

Referring to FIGS. 16 and 17 together, FIG. 16 shows a schematic diagram of the structure of a supporting plate 211 according to a fifth embodiment of the present application, and FIG. 17 shows a partial sectional view of the connection between the supporting plate and the tower tube section body. As an optional embodiment, the at least one supporting plate 211 further includes a position limiting portion 2116. The position limiting portion 2116 is arranged opposite to the protruding portion 2111 in the radial direction Z of the tower tube section body 10 and connected to the laminated portion 2112. The position limiting portion 2116 at least partially protrudes out of the laminated portion 2112 in the axial direction Y of the tower tube section body 10.

Through the above arrangement, when the supporting plate 211 is connected to the tower tube section body 10, the supporting plate 211 can be connected to the flange 12 of the corresponding tower tube section body 10 through the through hole 2115 on the laminated portion 2112. Since the position limiting portion 2116 at least partially protrudes out of the laminated portion 2112 in the axial direction of the tower tube section body 10, the position limiting portion 2116 can abut against the inner surface of end flange 12 of the corresponding tower tube section body 10, so that when the reinforcing cable 22 pulls the supporting plate 211, the position limiting position 2116 can restrict the supporting plate 211 as a whole from being pulled and offset from the predetermined position by the reinforcing cable 22 in the radial direction Z of the tower tube section body 10, thereby preventing the supporting plate 211 from separating from the flange 12 of the tower tube section body 10, and further ensuring the reliability of connection between the supporting plate 211 and the tower tube section body 10.

In specific implementation, the position limiting portion 2116 may include a plurality of position limiting units 2116a that are arranged at intervals around the axis of the tower tube section body 10 together and respectively connected to the laminated portion 2112. Each position limiting unit 2116a protrudes out of the laminated portion 2112 on at least one end in the axial direction Y. Of course, it may protrude out of the laminated portion 2112 on both ends. This arrangement can also ensure the reliability of the connection between the supporting plate 211 and the tower tube section body 10, and at the same time can reduce the weight of the supporting plate 211 and reduce its cost.

Figure 18:
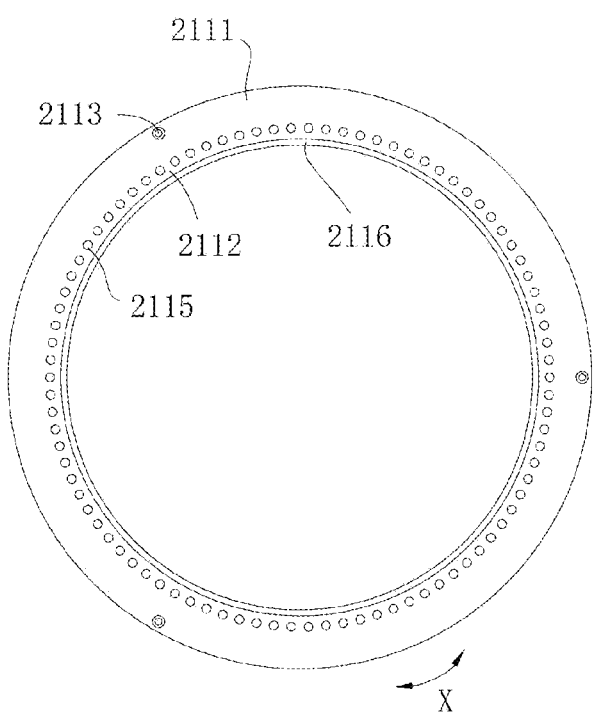
FIG. 18 is a schematic diagram of the structure of the supporting plate according to a sixth embodiment of the present application.

Referring to FIG. 18 together, FIG. 18 shows a schematic diagram of the structure of a supporting plate according to a sixth embodiment of the present application. The position limiting portion 2116 is not limited to including a plurality of position limiting units 2116a that are arranged at intervals around the axis of the tower tube section body 10 together and are respectively connected to the laminated portion. In some optional examples, the position limiting portion 2116 is also a closed ring body extending in the circumferential direction X of the tower tube section body 10. This arrangement ensures the reliability of the connection between the supporting plate 211 and the tower tube section body 10, and can further make the force of the supporting plate 211 more uniform and improve its service life.

Figure 19:
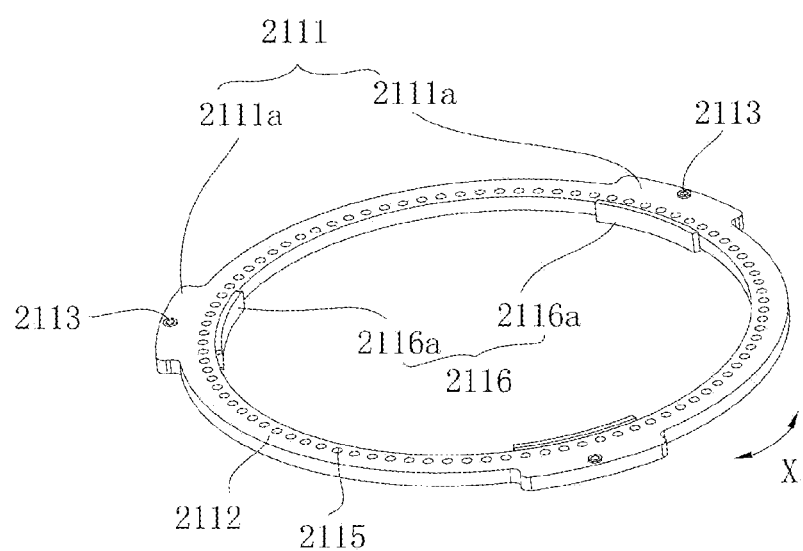
FIG. 19 is a schematic diagram of the structure of the supporting plate according to a seventh embodiment of the present application.

Referring to FIG. 19, FIG. 19 shows a schematic diagram of the structure of a supporting plate 211 according to a seventh embodiment of the present application. In the above embodiments, the protruding portion 2111 of the supporting plate 211 is a closed ring body extending along the circumferential direction X of the tower tube section body 10. This is only an optional way, but not limited to this way. In some other examples, the protruding portion 2111 may further include a plurality of connecting units 2111a that are arranged at intervals around the axis of the tower tube section body 10 together and respectively connected to the laminated portion 2112, and each connecting unit 2111a is provided with at least one connecting position 2113. This arrangement can be better applied to the tower tube section 100 with a small number of reinforcing cables 22, which reduces the weight of the supporting plate 211 and reduces the cost thereof further on the basis of meeting the requirements for the connection between the reinforcing cables 22 and the tower tube section body 10. In specific implementation, the number of connecting units 211a can be disposed according to the number of connecting positions 2113 and the number of reinforcing cables 22 to be connected.

In this implementation, when the position limiting portion 2116 also includes a plurality of position limiting units 2116a that are spaced apart from each other around the axis of the tower tube section body 10 together and are respectively connected to the laminated portion 2112, the number of the connecting units 2111a and the number of the position limiting units 2116a are the same and the connecting units 2111a and the position limiting units 2116a are arranged in a one-to-one correspondence in the radial direction Z of the tower tube section body 10. This arrangement can not only meet the reliability of the connection between the reinforcing cable 22 and the tower tube section body 10, but also enable the structure of the supporting plate 211 is more optimized.

Figure 20:
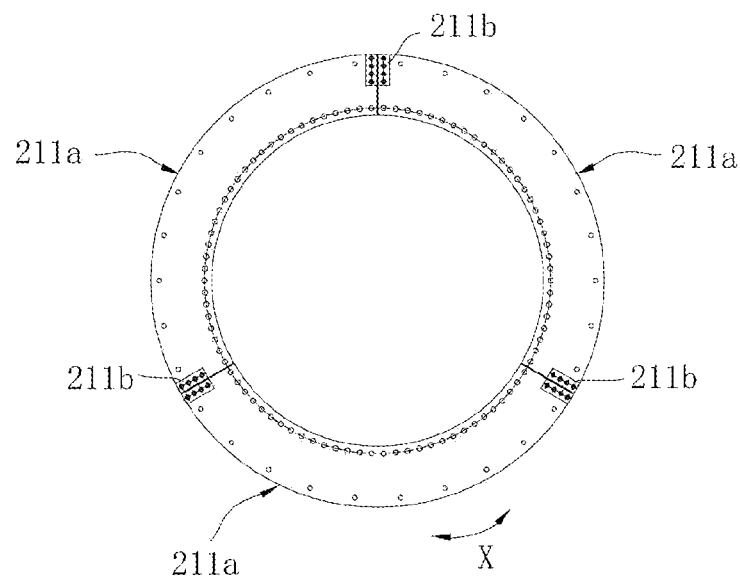
FIG. 20 is a schematic diagram of the structure of the supporting plate according to an eighth embodiment of the present application.

Referring to FIG. 20 together, FIG. 20 shows a schematic diagram of the structure of a supporting plate 211 according to an eighth embodiment of the present application. In order to facilitate the transportation of the tower tube section 100 of the embodiment of the present application, optionally, at least one supporting plate 211 is formed by splicing more than two arc-shaped plates 211a, and the number of the arc-shaped plates 211a may be three, four, or even more. More than two arc-shaped plates 211a are arranged in sequence along the circumferential direction X of the tower tube section body 10 and joined to each other. Two adjacent arc-shaped plates 211a can be connected by welding after being transported to a predetermined position. Of course, in some other examples, two adjacent arc-shaped plates 211a can be detachably connected to each other through an adapter 211b. The adapter 211b may be a plate-shaped body, and the adapter 211b and the corresponding arc-shaped plate 211a may be connected to each other by fasteners such as bolts. The supporting plate 211 can be provided with an adapter 211b at one end of the tower tube section body 10 in the axial direction Y, of course, an adapter 211b can also be provided at both ends of the tower tube section body 10 in the axial direction Y, as long as it can meet the requirements of the connection between the two adjacent plates 211a.

Figure 21:
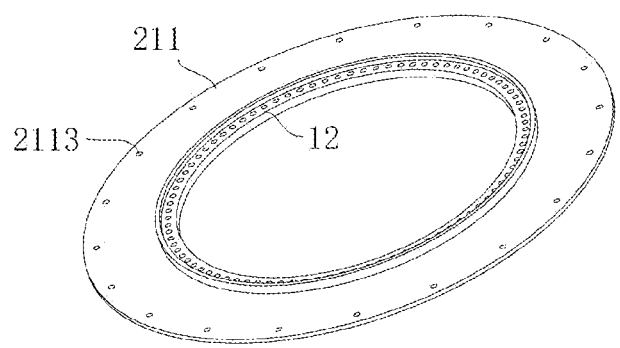
FIG. 21 is a schematic diagram of the structure of the supporting plate according to a ninth embodiment of the present application.

Referring to FIG. 21, FIG. 21 shows a schematic diagram of the structure of a supporting plate 211 according to a ninth embodiment of the present application. In specific implementation, in order to facilitate the assembly of the tower tube section 100, optionally, the supporting plate 211 and the flange 12 on the cylinder 11 opposed to the supporting plate 211 is an integral structure.

Figure 22:
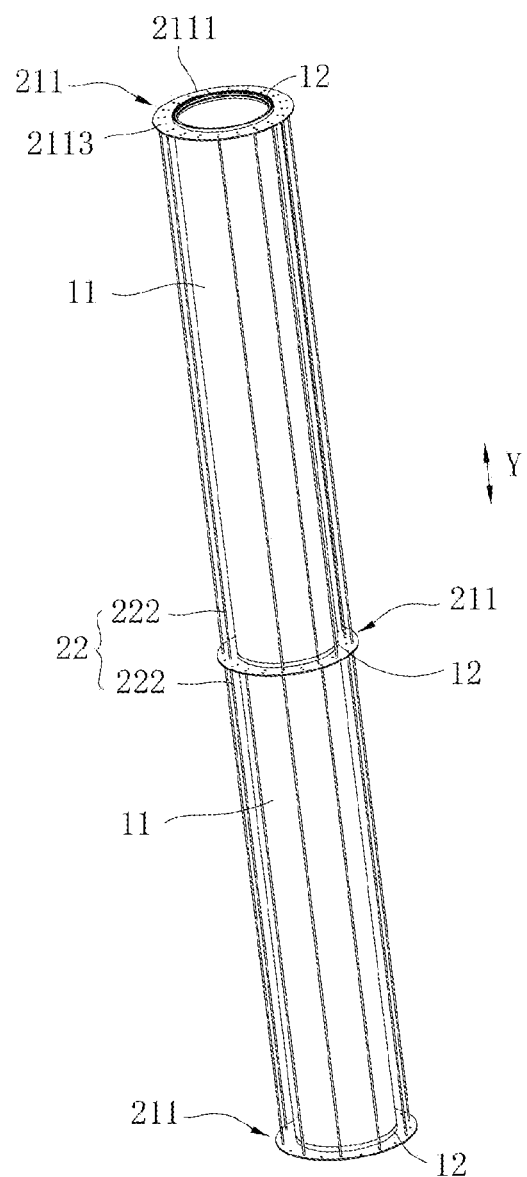
FIG. 22 is a schematic diagram of the structure of a tower tube section according to another embodiment of the present application.

Referring to FIG. 22 together, FIG. 22 shows a schematic diagram of the structure of a tower tube section 100 according to another embodiment of the present application.

The above embodiments are described by taking the tower tube section 100 including one section of the cylinder 11 as an example. It can be understood that this is an optional implementation. In some other examples, as shown in FIG. 22, the tower tube section 100 may also include two or more sections of the cylinders 11, and the two or more sections of the cylinders 11 are stacked in the axial direction Y. At this time, the supporting member 21 is not limited to including two supporting plates 211, and may also include a plurality of supporting plates 211 arranged at intervals along the axial direction Y. A supporting plate 211 is provided on the surfaces away from each other of the two cylinders 11 on the outermost side in the axial direction Y, and one supporting plate 211 is clamped between two adjacent sections of the cylinders 11.

In order to ensure a better connection with each supporting plate 211, each reinforcing cable 22 includes the same number of rod units 222 as the cylinder 11, and a plurality of rod units 222 are provided on a periphery of each cylinder 11 at intervals. The rod units 222 arranged around the same cylinder 11 are all connected to the protruding portion 2111 of the supporting plate 211 at both ends of the cylinder 11, specifically connected to the connecting position 2113 on the protruding portion 2111. The structure form of the connecting position 2113 is same as the above embodiments. Because each of the above embodiments includes only one cylinder 11, each reinforcing cable 22 includes one rod unit 222. However, in this embodiment, since the number of cylinders 11 is more than two, correspondingly, each reinforcing cable 22 may include more than two rod units 222. The connection form between the rod unit 222 and the connecting position 2113 is the same as that of the above-mentioned embodiments, and will not be repeated here.

Figure 23:
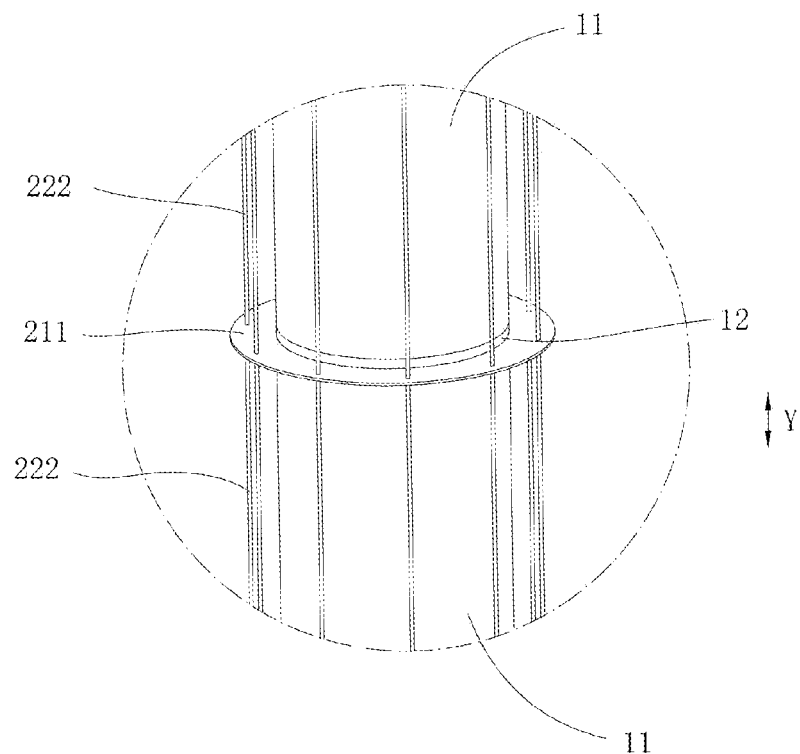
FIG. 23 is a partial diagram of the structure of a tower tube section according to further another embodiment of the present application.
Figure 24:
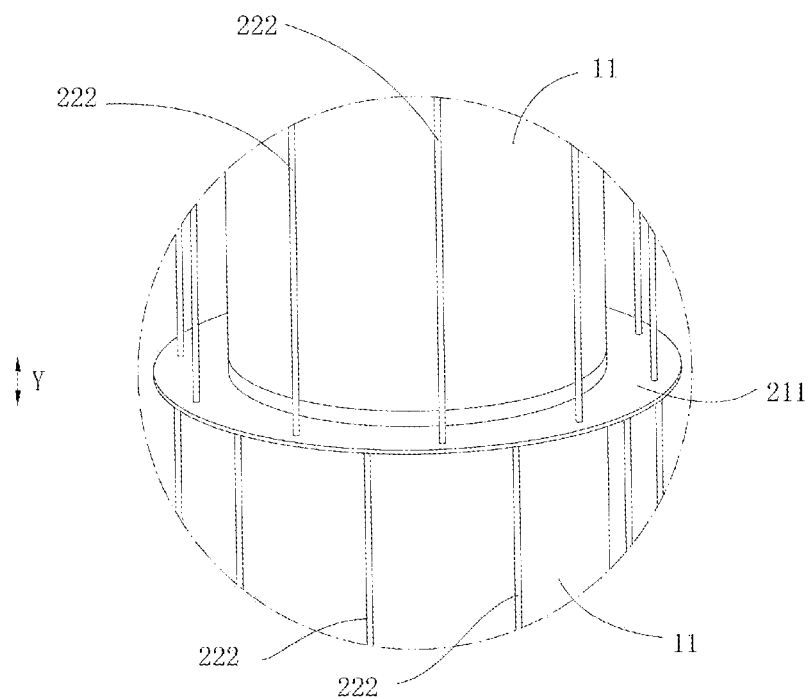
FIG. 24 is a schematic diagram of the partial structure of a tower tube section according to still another embodiment of the present application.

Referring to FIGS. 23 and 24 together, FIGS. 23 and 24 show a schematic diagrams of the partial structure of the tower tube section 100 according to two different embodiments of the present application. As shown in FIG. 22, as an optional implementation manner, the rod units 222 on a periphery of one of the two adjacent cylinders 11 is arranged in one-to-one correspondence with the rod units 222 on a periphery of the other of the two adjacent cylinders 11. At this time, along the axial direction Y of the tower tube section body 10, the two adjacent rod units 222 may be an integral structure. Of course, as shown in FIG. 23, the rod units 222 on the periphery of one of the two adjacent cylinders 11 and the rod units 222 on the periphery of the other of the two adjacent cylinders 11 are not limited to one-to-one corresponding arrangement, and can also be arranged to be interleaved with each other in the circumferential direction X of the tower tube section body 10. At this time, along the axial direction Y of the tower tube section body 10, the two adjacent rod units 222 may be a split structure, which can be disposed according to the bearing requirements of the entire tower tube section 100.

Therefore, the tower tube section 100 provided by the embodiment of the present application includes a tower tube section body 10 and a reinforcing assembly 20. The reinforcing assembly 20 includes a supporting member 21 connected to the tower tube section body 10 and a plurality of reinforcing members connected to the supporting member 21. At the same time, because a plurality of reinforcing cables 22 are spaced apart from each other along the circumferential direction X of the tower tube section body 10 and each reinforcing cable 22 extends along the axial direction Y of the tower tube section body 10, when the tower tube section 100 is applied to the tower tube and bears the load, the load acting on the tower tube section body 10 can be transmitted to the plurality of reinforcing cables 22 through the supporting member 21, and the plurality of reinforcing cables 22 jointly share the load borne by the tower tube section body 10, thereby improving the bearing capacity of the entire tower tube section 100. However, each reinforcing cable 22 is defined to be separated from the tower tube section body 10 by a predetermined distance in the radial direction Z of the tower tube section body 10, so that the tower tube section body 10 and the reinforcing assembly 20 can be processed separately, and the original structure of the tower tube section body 10 will not be damaged. Under the premise of improving the bearing capacity of the tower tube section 100, the processing difficulty and processing cost can be reduced.

Compared with the prior art, embodiments of the present application provide a tower tube section 100 with a new idea, and has a stronger bearing capacity than the tower tube section 100 in the prior art. More importantly, in the tower tube section 100 provided by the embodiment of the present application, the reinforcing assembly 20 and the tower tube section body 10 can be manufactured separately, and no structure may be added to the tower tube section body 10, which is convenient for the reinforcing assembly 20 and the tower tube section body 10 to be separately manufactured and shipped. At the same time, when the tower frame 1 is mounted, the supporting member 21 and the reinforcing cable 22 of the reinforcing assembly 20 can be mounted at the same time as the tower tube section body 10 is mounted. No additional equipment is required to mount the reinforcing cable 22, which is easier to mount.

In the tower frame 1 provided by the embodiment of the present application, any one section of the plurality of tower tube sections 100 included can adopt the tower tube section 100 of each of the above embodiments, so it has a better bearing capacity, can ensure the power generation benefits of wind power generator sets and is beneficial to the development of wind power generator sets to a higher megawatt level.

Figure 25:
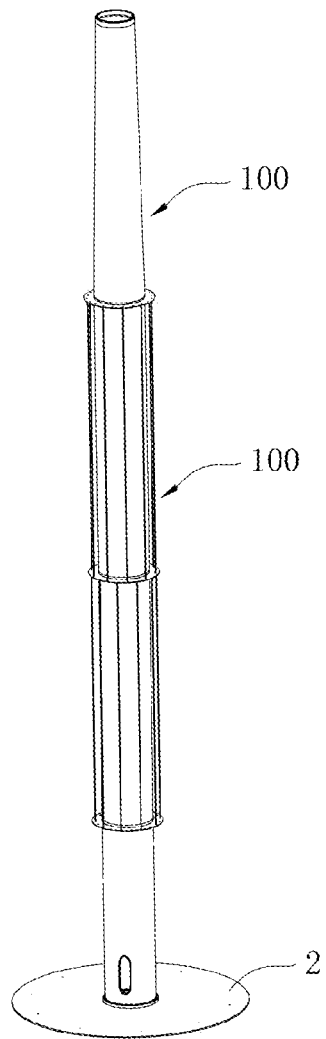
FIG. 25 is a schematic diagram of the structure of a tower frame according to another embodiment of the present application.
Figure 26:
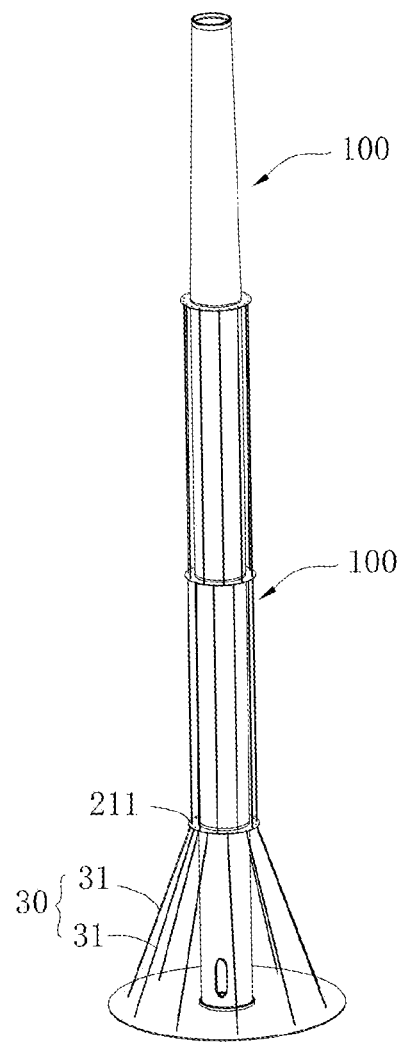
FIG. 26 is a schematic diagram of the structure of a tower frame according to further another embodiment of the present application.

Referring to FIG. 25 and FIG. 26 together. FIG. 25 and FIG. 26 show schematic diagrams of the structure of a tower frame 1 according to two other different embodiments of the present application. As an optional implementation manner, the tower frame 1 provided in the embodiment of the present application starts from the wind generator base 2, and the second tower tube section 100 along the stacking direction is the tower tube section 100 of any of the above embodiments. The remaining tower tube sections 100 of the frame 1 may be the tower tube sections 100 of any of the above-mentioned embodiments, and of course may also be ordinary tower tube sections that only include the tower tube section body 10.

Optionally, the tower frame 1 further includes a diagonal tie rod group 30. The diagonal tie rod group 30 includes multiple diagonal tie rods 31. One end of the multiple diagonal tie rods 31 is connected to the supporting member 21, and optionally connected to the supporting plate 211 of the supporting member 21 arranged close to the wind generator base 2. It can be understood that, in some examples, the other ends of the multiple diagonal tie rods 31 are not limited to be connected to the wind generator base 2, and an independent tie rod base can also be provided for being connected with the other ends of the multiple diagonal tie rods 31. In specific implementation, the tie rod base can be a structure such as anchor bolts or a concrete foundation partially buried in the ground. Of course, some of the multiple diagonal tie rods 31 are connected to the wind generator base 2, and the rest are connected to the tie rod base, which can be disposed according to requirements.

By arranging the diagonal tie rod 31 and matching it with the tower tube section 100 with the reinforcing assembly 20, the bearing capacity of the entire tower frame 1 can be further improved. Compared with the cable-type tower frame in the prior art, in the tower frame 1 provided by the embodiment of the present application, the diagonal tie rod 31 matches with the tower tube section 100 with the reinforcing assembly 20, the tower frame 1 can be connected with the supporting plate 211 on the tower tube section 100 close to the wind power generator base 2 to meet the bearing capacity of the tower frame 1 Therefore, under the condition of the same bearing capacity, the tower tube section 100 provided by the embodiment of the present application has a smaller footprint, and is more suitable for wind power generator set in densely populated areas with high land acquisition pressure than the prior art. The overall cost is lower. In addition, since multiple diagonal tie rods 31 can be connected to the supporting plate 211 at the top flange of the lowermost tower tube section 100, compared with the prior art, the distance from the blade 402 can be greater, and the problem that in the prior art, the diagonal tie rod 31 interferes with the blade 402 is avoided effectively.

The wind power generator set provided by the embodiments of the present application includes the tower frame 1 of the above embodiments, so it has better stability, a small area, a wide application range, and can ensure that it has a higher megabit watt level and power generation benefits.

Although the present application has been described with reference to the preferred embodiments, various modifications can be made to it without departing from the scope of the present application and the components therein can be replaced with equivalents. In particular, as long as there is no structural conflict, the various technical features mentioned in the various embodiments can be combined in any manner. The present application is not limited to the specific embodiments disclosed in the text, but includes all technical solutions falling within the scope of the claims.

What is claimed is:

1. A tower tube section comprising:
  a tower tube section body;

a reinforcing assembly comprising a supporting member connected to the tower tube section body and a plurality of reinforcing cables connected to the supporting member, wherein the plurality of reinforcing cables are spaced apart from each other along a circumferential direction of the tower tube section body, each of the plurality of reinforcing cables extends along an axial direction of the tower tube section body and is apart from a periphery surface of the tower tube section body in a radial direction of the tower tube section body by a predetermined distance, wherein the supporting member comprises a supporting plate, the supporting plate comprises a protruding portion protruding out of the periphery surface of the tower tube section body in the radial direction and connected to the plurality of reinforcing cables, and a position limiting portion abutting against an inner surface of the tower tube section body.

2. The tower tube section according to claim 1, wherein the supporting member comprises two or more supporting plates arranged at intervals along the axial direction and respectively connected to the tower tube section body, each of the supporting plates comprises a laminated portion connected to the tower tube section body in a stacking manner, and the protruding portion of each supporting plate is connected to the laminated portion.

3. The tower tube section according to claim 2, wherein a plurality of connecting positions are provided on the protruding portion, and each of the plurality of reinforcing cables is connected to the protruding portion through one of the plurality of connecting positions.

4. The tower tube section according to claim 3, wherein the plurality of connecting positions are divided into two or more groups of connecting positions arranged at intervals along the radial direction, and the connecting positions comprised in each group of connecting positions are arranged at intervals along the circumferential direction, and the plurality of reinforcing cables and part or all of the connecting positions of at least one group of connecting positions are connected to each other in one-to-one correspondence.

5. The tower tube section according to claim 3, wherein at least one of the plurality of connecting positions is a through hole that penetrates one of the supporting plates along the axial direction, a locking member is provided at the through hole, and the locking member fixes one of the plurality of reinforcing cables to corresponding one of the plurality of connecting positions.

6. The tower tube section according to claim 5, wherein the locking member comprises two or more locking nuts, and at least two of the locking nuts are arranged opposed to each other on both sides of the protruding portion in the axial direction and is connected with one of the plurality of reinforcing cables via a threaded connection;

or, the locking member comprises two or more arc-shaped locking plugs, and the two or more arc-shaped locking plugs are spliced with each other to form a conical ring body, and the locking member at least partially extends into one of the plurality of connecting positions to clamp and fix one of the plurality of reinforcing cables.

7. The tower tube section according to claim 5, wherein a protective sleeve is detachably connected to inside of at least one of the plurality of connecting positions, and the protective sleeve extends along the axial direction.

8. The tower tube section according to claim 3, wherein at least one of the plurality of connecting positions is an ear seat with a rotating shaft, and one of the plurality of reinforcing cables is rotatably connected with the rotating shaft.

9. The tower tube section according to claim 2, wherein the position limiting portion is arranged opposite to the protruding portion in the radial direction and connected to the laminated portion, and the position limiting portion at least partially protrudes out of the laminated portion in the axial direction.

10. The tower tube section according to claim 9, wherein the position limiting portion is a closed ring extending along the circumferential direction;

or the position limiting portion comprises a plurality of position limiting units, and the plurality of position limiting units are arranged at intervals around the axis of the tower tube section body together and respectively connected to the laminated portion, and at least one end of each of the plurality of position limiting units in the axial direction protrudes out of the laminated portion.

11. The tower tube section according to claim 2, wherein the protruding portion is a closed ring extending along the circumferential direction;

or the protruding portion comprises a plurality of connecting units, and the plurality of connecting units are arranged at intervals around an axis of the tower tube section body together and respectively connected with the laminated portion, and at least one of the plurality of connecting positions is provided on each of the plurality of connecting units.

12. The tower tube section according to claim 2, wherein the tower tube section body comprises one section of cylinder, and two supporting plates are arranged at intervals along the axial direction, one of the supporting plates is connected to one end of the cylinder in the axial direction, and the other supporting plate is connected to the other end of the cylinder in the axial direction.

13. The tower tube section according to claim 2, wherein the tower tube section body comprises two or more sections of cylinders stacked in the axial direction;

the more than two supporting plates are arranged at intervals along the axial direction, two cylinders on the outermost side in the axial direction are provided with one of the more than two supporting plates respectively on surfaces thereof far away from each other, and one of the more than two supporting plates is clamped between two adjacent cylinders;

each of the plurality of reinforcing cables comprises the same number of rod units as the number of the cylinders, each of the cylinders is provided with a plurality of rod units arranged at intervals on a periphery thereof, and the rod units arranged around the same cylinder are connected to the protruding portions of the supporting plates at both ends of the same cylinder respectively.

14. The tower tube section according to claim 13, wherein the rod units on a periphery of one of the two adjacent cylinders and the rod units on a periphery of the other of the two adjacent cylinders are arranged in one-to-one correspondence or arranged to be interleaved with each other.

15. The tower tube section according to claim 2, wherein at least one of the two or more supporting plates comprises a plurality of arc-shaped plates, and the plurality of the arc-shaped plates are spliced with each other along the circumferential direction.

16. A tower frame connected to a wind generator base, wherein the tower frame comprises two or more tower tube sections, the two or more tower tube sections are stacked on each other, the tower tube section located on the outermost side in the stacking direction can be connected to the wind generator base, wherein at least one of the tower tube sections is the tower tube section according to claim 1.

17. The tower frame according to claim 16, wherein the tower frame further comprises a plurality of diagonal tie rods, one end of each of the plurality of diagonal tie rods is connected to the supporting member, and the other end of each of the plurality of diagonal tie rods is connected with the wind generator base and/or a tie rod base.

18. A wind power generator set comprising the tower frame according to claim 16.

* * * * *